United States Statutory Invention Registration [19]

[11] Reg. Number: H65

Beni et al. [45] Published: May 6, 1986

[54] DYNAMIC OPTICAL SENSING: ROBOTIC SYSTEM AND MANUFACTURING METHOD UTILIZING SAME

[75] Inventors: Gerard Beni, Old Bridge, N.J.; Susan Hackwood, Freehold; Lawrence A. Hornak, Ocean; Janet L. Jackel, Holmdel, all of N.J.

[73] Assignee: AT&T Bell Laboratories, Murray Hill, N.J.

[21] Appl. No.: 498,881

[22] Filed: May 27, 1983

[51] Int. Cl.[4] ..... B66C 1/00

[52] U.S. Cl. ..... 414/730; 356/373; 401/35

[58] Field of Search ..... 356/373, 375; 414/730; 901/35, 47

[56] References Cited

U.S. PATENT DOCUMENTS 3,770,140 11/1973 Dukette ..... 901/23 X

FOREIGN PATENT DOCUMENTS 53-13767 2/1978 Japan ..... 901/47 X

OTHER PUBLICATIONS

Heikkinen, D. W., "Pitch & Yaw Rotary Axis Calibration Device", I.B.M. Tech. Discl. Bull., vol. 24, No. 3, Aug. 1981.

Wilson, K. W., "Fiber Optics: Practical Vision for the Robot" Robotics Today, Fall 1981, pp. 31, 32.

Inaba H., WO82/02436, Int'l Patent Application, published 7/1982.

*Primary Examiner*—Harold J. Tudor

*Attorney, Agent, or Firm*—Michael J. Urbano

[57] ABSTRACT

Two opposing fingers of a robot hand are each provided with an array of optical devices which are capable of being in optical communication with one another through the gap between the fingers. One finger is provided with an array of light emitters and the other is provided with an array of light recepetors. By taking advantage of the motion of the robot hand and the small size of the optical devices, the shape of an object between the fingers can be detected by using at least one linear set, and preferably at least two linear sets, of devices in each array. Illustratively, the linear sets form a T-shaped array or a U-shaped array and are disposed along the edges of the fingers. In one embodiment the emitters are GRIN rod lenses coupled through a fiber cable to a light source, and the receptors are also GRIN rod lenses coupled through a fiber cable to a camera system. A manufacturing method utilizing such a sensor to identify the shape of objects is also described.

17 Claims, 5 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

(a)

(b)

(c)

DYNAMIC OPTICAL SENSING: ROBOTIC SYSTEM AND MANUFACTURING METHOD UTILIZING SAME

BACKGROUND OF THE INVENTION

This invention relates to the field of robotics and, more particularly, to robotic systems incorporating dynamic optical sensing and to manufacturing methods utilizing same.

Current research in robotics is to a large extent devoted to sensors which extend the capabilities of a robot in two ways. First, sensors are used by the robot to acquire a target object. Second, once the object has been acquired, the robot uses sensors to inspect and guide manipulation of the object. The first class of sensors (acquisition sensors) includes vision and proximity sensors. A magnetic proximity sensor is described by G. Beni et al. in copending application Ser. No. 480,826 filed on Mar. 31, 1983 and assigned to the assignee hereof. The second class (inspection-manipulation sensors) includes tactile and force-torque sensors of the type described by G. Beni et al. in copending application Ser. No. 498,908 filed on May 27, 1983, which is also commonly assigned. Generally, sensors of the acquisition type operate without contacting the object, whereas sensors of the inspection-manipulation type come in contact with the object.

For most sensors proposed and/or implemented in the prior art, the sensing field is constant in time as, for example, in a fixed camera or a tactile pad. Exceptions are cameras mounted on robot hands described by M. Shneier et al. at the Workshop on Industrial Applications of Machine Vision, Washington, D.C. (1982), and fingertip sensors for a three-fingered robot hand described by J. K. Salisbury, *Proceedings of the Joint Automation Control Conference,* University of Virginia, Charlottesville, Virginia, p. TA2C (1981). In both of these cases, robot-manipulation is used to increase the sensory information about the object investigated; i.e., the sensing is a dynamic process.

However, most of the current vision systems, as described by R. P. Kruger et al., *Proceedings of the IEEE,* Vol. 69, p. 1524 (1981), use static overhead cameras placed above the robot working area. This static arrangement has the advantage of decoupling the calculation of position and orientation of the object from the robot motion. The robot is not slowed down by the vision system, which operates independently. This static arrangement, however, has a major drawback. The vision system is ineffective when it is most needed; i.e., when the robot is about to retrieve a part, since the robot arm blocks the field of view of the camera placed above the robot working area. To overcome this problem, camera-in-hand systems have been proposed and implemented. This method has the advantage of never hiding from the camera the part to be acquired. However, the robot must stop its motion to allow the camera to process the image and calculate position and orientation of the part.

Recently this problem has been alleviated by using a low-resolution camera, see, C. Loughlin, *Sensor Review,* Vol. 3, p. 23 (1983), rigidly fixed to the robot gripper. An example is the Insight 32 TM system (Insight 32 is a trademark of Unimation Corporation of Danbury, Conn.). This system uses a camera with a resolution of 32×32 pixels. At this low resolution, the scan time is 20 msec and the processing time for simple binary vision algorithms can be kept below 8 msec so that part location is effected within the allotted 28 msec of a typical robot loop cycle (e.g., a Puma 500 TM robot; Puma 500 is also a trademark of Unimation Corporation). Clearly, this low-resolution mobile vision system is an improvement over the traditional high resolution static camera method because 70% of industrial applications do not require part recognition but only part location and orientation. On the other hand, even with a mobile camera the process of part location and orientation is still limited by the binary vision system, which basically sees only silhouettes of images. In addition, this vision system has exacting requirements for contrast (e.g., backlit tables, white surfaces, etc.). To improve the efficiency of orientation-location, this type of mobile vision system can be complemented by dynamic sensing in accordance with our invention.

SUMMARY OF THE INVENTION

In accordance with one aspect of our invention, we take advantage of robot dynamics in the design of a noncontact, inspection-type sensor which may be incorporated into the fingers of the robot's hand or gripper. From our analysis of the relationship between the number and speed of the sensing elements as a function of their response and processing times, we have determined that a relatively small number of sensors linearly arranged on a robot can provide a substantial amount of information as to an object's shape. Accordingly, in one embodiment of our invention two opposing fingers of a robot hand are each provided with an array of optical devices which are capable of being in optical communication with one another through the gap between the fingers. One finger is provided with an array of light emitters and the other is provided with an array of light receptors. Each array includes at least one linear set of devices and in a preferred embodiment each array includes at least two linear sets of devices arranged so that the lines passing through the sets are at an angle to one another. Illustratively, two linear sets form a T-shaped (or L-shaped) array or three sets form a U-shaped array. These arrays are disposed along the edges of the fingers. An object between the fingers blocks transmission of light from selected emitters to corresponding receptors, so that as the robot hand is moved, the signals from the receptors provide information as to the shape of the object.

Alternatively, the arrays of optical devices are mounted, for example, on a table top, and the robot may be used to move the object while it is disposed between the arrays. In accordance with another aspect of our invention, a manufacturing method, which includes a process for inspecting an object, includes the steps of: causing the above-described hand of a robot to move to position the object between its fingers, moving the hand so that the arrays on the fingers scan the object, and controlling the position of the robot and the handling of the object in response to the shape information derived from the array of light receptors.

BRIEF DESCRIPTION OF THE DRAWING

Our invention, together with its various features and advantages, can be readily understood from the following, more detailed description taken in conjunction with the accompanying features, in which.

DETAILED DESCRIPTION

Figure 1:
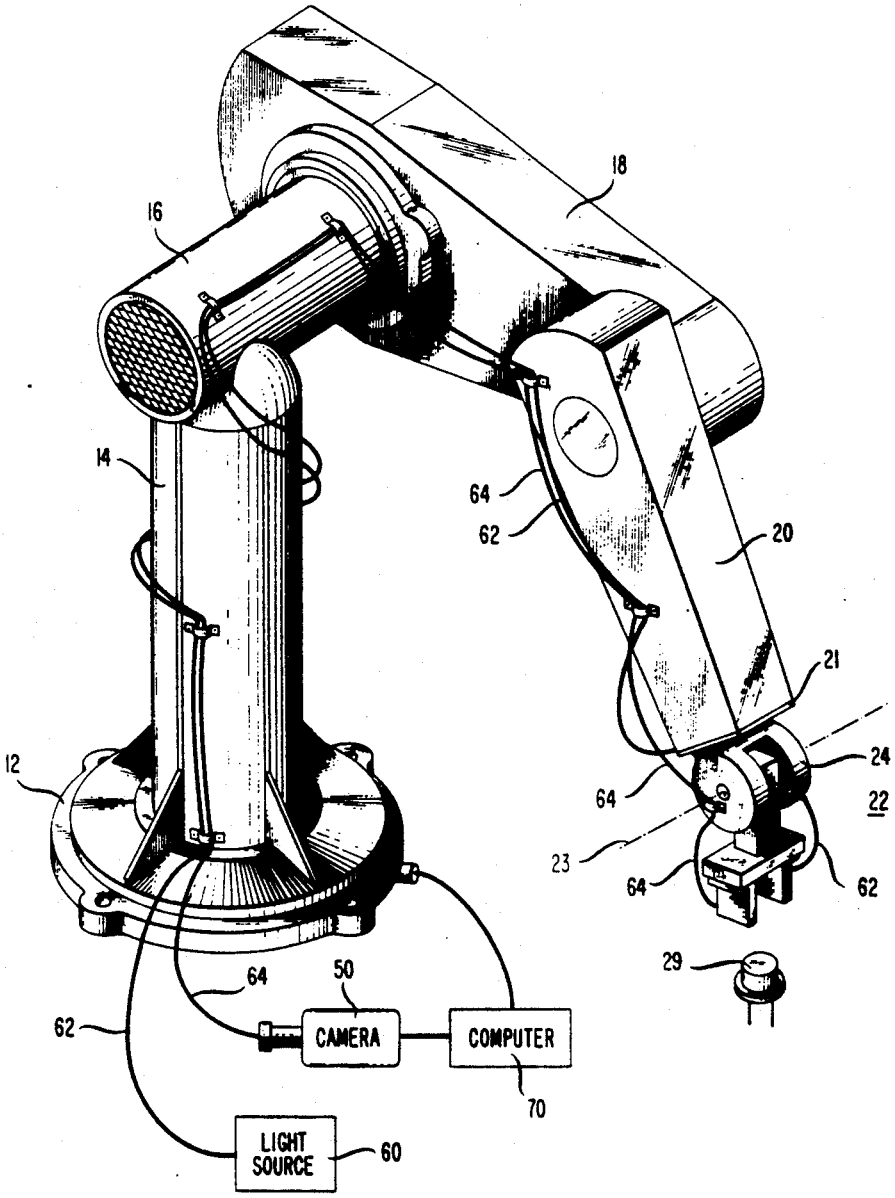
FIG. 1 is an isometric view of a robot for inspecting and/or handling an object illustratively depicted as a header package for a semiconductor component.
Figure 2:
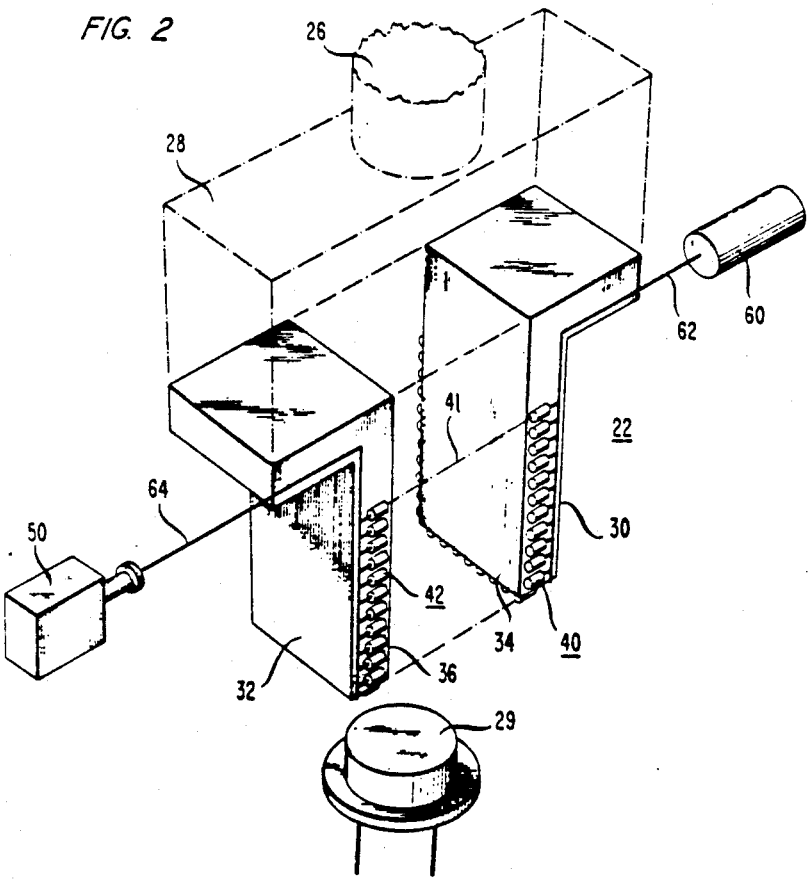
FIG. 2 is an enlarged isometric view of the robot gripper of FIG. 1 which has been provided with an array of optical devices on each finger in accordance with one embodiment of our invention.

With reference now to FIGS. 1 and 2, there is shown a robot 10 comprising a base 12, a vertical cylindrical body 14 mounted on the base, a shoulder member 16 cantilevered at the top of the body 14, an upper arm 18 pivotally mounted at one end to shoulder member 16 and at the other end to forearm 20. The extremity of forearm 20 includes a pneumatic or servo-driven hand commonly termed a gripper 22 which is pivotally mounted thereto to enable rotation about three axes. The gripper 22 includes a base 21 which rotates about the axis of forearm 20, a post 26 which pivots about axis 23 of flanges 24, and a palm member 28 which rotates about the axis of post 26. A pair of fingers 30 and 32 are slidably mounted on the palm member 28 preferably so that the opposing faces 34 and 36 are maintained essentially parallel during opening and closing. A computer 70 may be used to control the gap between the fingers of a servo-driven hand.

In accordance with one embodiment of our invention, the finger 30 is provided with an array 40 of optical emitters, and the finger 32 is provided with an array 42 of optical receptors. The emitters may be active elements (such as LEDs or junction lasers) or passive elements (such as light guides). Likewise, the receptors may be active elements (such as photodiodes) or passive elements (such as light guides or lenses). In either case, the array 40 emits a pattern of light beams 41 according to the geometric layout of the emitters. The receptor array has a corresponding layout so that there is a one-to-one relationship between emitters and receptors. In addition, the emitters are adapted to generate collimated, parallel beams so that each beam is detected regardless of the position or motion of the fingers. This sensor array operates by detecting the presence and shape of an object 29 between the fingers. Illustratively, the object is depicted as a header for a semiconductor device. When positioned between the fingers, the object interrupts or blocks one or more of the parallel beams that pass between the fingers causing a change in the detected image displayed on camera 50 (or other suitable display).

An array 40 of active emitters would be driven by an electrical source 60 via an electrical cable 62 whereas passive emitters would be driven by an optical source 60 (e.g., a laser) via an optical fiber cable 62. Similarly, the electrical signals generated by an array 42 of active receptors would be coupled via an electrical cable 64 to camera 50, but the optical signals from passive receptors would be coupled via an optical fiber cable 64 to camera 50. In either case, the cables, which are shown in FIG. 1 as running alongside the robot parts, are long enough to allow rotation of the robot joints.

In accordance with our invention each array of emitters and receptors includes at least one linear set of optical devices. But where higher speed processing is desired, that is where the time to move the object through the sensor field and to perform the necessary calculations from the data generated by the sensor is greater than the robot loop cycle, it is preferred that each array include at least two linear sets of devices arranged so that the lines passing through the sets are at an angle to one another. Typically, the linear sets are at right angles to one another in a U-shaped or T-shaped pattern.

Figure 3:
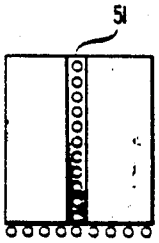
FIG. 3 shows a T-shaped array of optical devices in accordance with an alternative embodiment of our invention.
Figure 4:
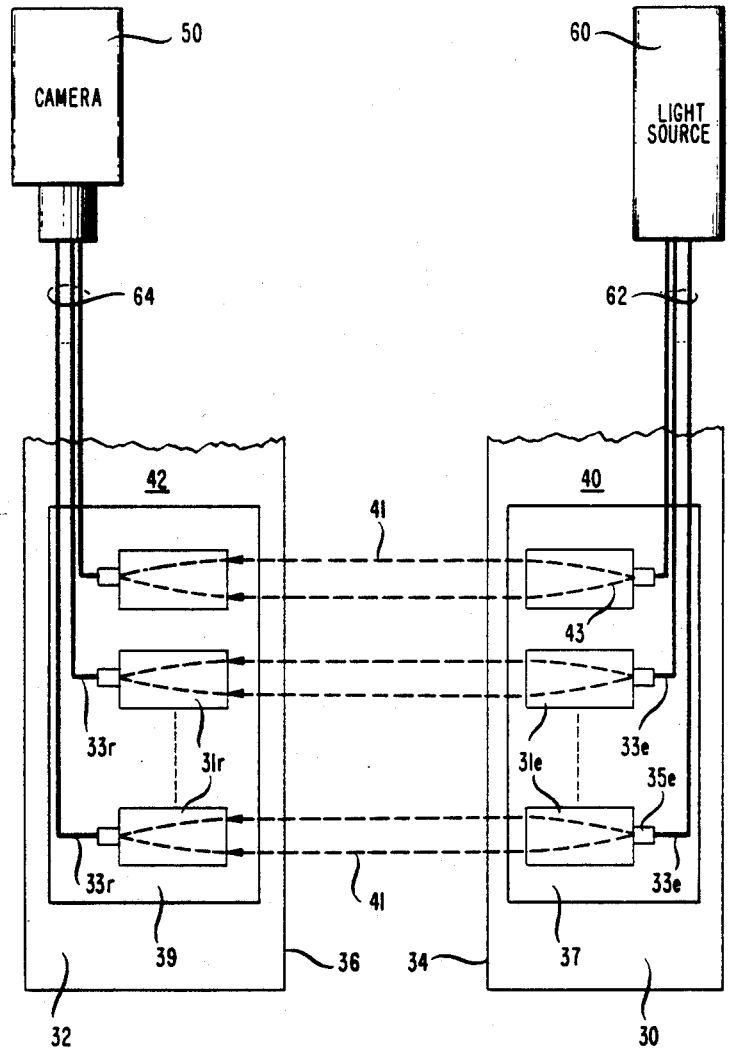
FIG. 4 is an enlarged side view of the sensor array of FIG. 2.

An illustration of the implementation of our invention using GRIN rods as passive emitters and receptors will be described now in conjunction with FIGS. 2–4.

In this illustration, the arrays 40 and 42 each include three linear sets of GRIN rod lenses which are Graded Refractive Index rods well-known in the optics art as described by C. M. Schroeder, *Bell System Technical Journal*, Vol. 57, p. 91 (1978). The U-shaped array (FIG. 2) is disposed around the periphery of the fingers so that on each finger one linear set is located along one side, another linear set is along a parallel side, and the third linear set is along the bottom which connects the two sides. Alternatively, a T-shaped array (FIG. 3) may be used on the fingers. To avoid contact between the object and the vertical set, the latter is disposed in a groove 51 in the surface of the robot finger.

The array 40 of GRIN rod emitters is coupled via optical fiber cable 62 to light source 60, and the array 42 of GRIN rod receptors is coupled via optical fiber cable 64 to camera 50. The optical signal on cable 64 is analyzed by the camera 50, and the output of the camera is used by computer 70 (FIG. 1) to control the robot.

In the example which follows, numerical parameters are provided by way of illustration only, and unless otherwise stated, are not intended to limit the scope of the invention.

The fingers 30 and 32 are typically made in different sizes and of different materials. In this example, we used two inverted L-shaped pieces of aluminum 5 cm long, 2 cm wide and 0.8 cm thick. The maximum finger displacement was set at 2 cm.

The input cable 62 containing a bundle of optical fibers ran down the hand and alongside the edges of the finger. A U-shaped linear array 40 (FIG. 2) of quarter-pitch GRIN rod lenses was attached to the edges of the finger 30 (there were 36 lenses—12 along each edge and 12 across the bottom of the finger). As shown in FIG. 4, an optical fiber 33*e* was connected to the back of each lens 31*e*, but only three lenses of each array are shown for simplicity. The lenses collimated the light 41 across the 2 cm gap between the fingers. There was a corresponding array 42 of quarter-pitch GRIN rod lenses 31*r* on the other finger 32. These lenses 31*r* of array 42 were attached to fibers 33*r* which were bundled together to form the output cable 64. The output cable terminated in a photodetecting device (not shown). Light was thus passed between the two fingers as a linear array of parallel, equally spaced collimated beams 41.

The fiber cables typically included multimode 0.23 NA, 50 μm core diameter fibers. Input cable 62 was coupled to the output of a 4 mW He-Ne laser source 60. However, other suitable light sources (e.g., LEDs) can also be used. The end of each fiber was threaded through a short length of 60 μm bore capillary tube 35*e*.

The fiber protruding from the end of the tube was stripped of cladding and butted up against the back of the lens 31*e*. The 1 mm diameter, cylindrical, GRIN rod lenses had a parabolic refractive index distribution, as shown by light ray path 43, which produced collimated light beams 41 over a distance of about 5 cm.

The lenses 31*e* were mounted on a glass slide 37 attached to each edge of finger 30. The slides had 1 mm deep V-grooves (not shown) with a 1.5 mm center-to-center spacing cut across the short dimension. The lenses were cemented into the V-grooves. The input and output fibers of corresponding lines on each finger were aligned using an x-y-z translation stage attached to the small capillary tubes 35. When the cross talk and insertion losses were minimized, the small capillary tubes were also cemented in place. This arrangement ensured that the lenses were held parallel to one another and were equally spaced. The lenses were mounted about 1 mm from the inside edges (surfaces 34 and 36) of the fingers to prevent them from being damaged during object manipulation. The whole lens arrangement (apart from the lens faces) can be embedded in a protective resistant epoxy (not shown) to prevent damage by impact.

The gripper spacing was 2 cm in the open hand configuration. Over this distance the light remained collimated. In fact, little divergence was noticeable until a finger displacement of about 6 cm. We have used 1 mm diameter, 0.5 cm long, GRIN rod lenses (producing a collimated beam of about 1.0 mm in diameter) spaced 1.5 mm apart. The resolution of the sensor array was thus set at 1.5 mm. However, the resolution can be improved by using smaller lenses (e.g., 0.25 mm lenses are available) and closer spacing.

The fibers of output cable 64 were held between a pair of V-grooved silicon chips of the type described by C. M. Miller, *Bell System Technical Journal*, Vol. 57, p. 75 (1978). This arrangement allowed the fibers to be held with equal spacing (0.5 mm). Each chip accommodated 10 fibers and had both surfaces grooved to allow stacking on top of one another. For simplicity in this experiment, the output of the V-grooved chips was viewed by a video camera using a lens and mirror arrangement. In dynamic sensing, for fast processing time, this could be accomplished by using a CCD or photodetector array. In fact, a linear CCD array could be used as an active receptor in lieu of the array 42 of GRIN rod receptor lenses. This arrangement would eliminate the need for the fiberoptic connection between image sensing and image detecting. However, the use of linear CCD array may be restricted by particular finger geometry of the robot. The latter will determine which method of image detection is more convenient.

It is to be understood that the above-described arrangements are merely illustrative of the many possible specific embodiments which can be devised by represent application of the principles of the invention. Numerous and varied other arrangements can be devised in accordance with these principles by those skilled in the art without departing from the spirit and scope of the invention.

In some applications, it may be advantageous to use a video camera for image detection from the V-grooved silicon chips as the output from the fibers need occupy only a small portion of the scan time from a high resolution camera. The camera could be performing other visual tasks at the same time. However, there is a trade-off with processing time as the output from 36 sensors can be analyzed by scanning only 36 pixels.

Our dynamic sensor can be regarded as an extreme case of low resolution eye-in-hand vision. Although based on a much smaller number of sensing elements, the resolution can be comparable to or even higher than commercially available systems like the Insight 32. For the embodiment of our invention described above (1 mm elements, 1.5 mm apart), the effective resolution of one line of sensing elements is calculated as follows: a sensing element spacing of 1.5 mm is scanned in 1.5 msec at a robot speed of 1 m/sec; therefore, in a 28 msec robot loop cycle $28/1.5=18$ times the size of a single spacing is scanned; this corresponds to a resolution of eighteen 12-element lines or $12\times 18=216$ pixels. However, the design allows approximately an order of magnitude higher resolution. In fact, pixel size can be reduced from 1 mm to 0.25 mm. Allowing a processing time of 10 $\mu$sec per pixel (the same as the Insight 32), we could use one linear array of 25 sensing elements to obtain dynamically a $25\times 112=2800$ pixel picture in the 28 msec of the Puma 500 loop cycle.

Figure 5:
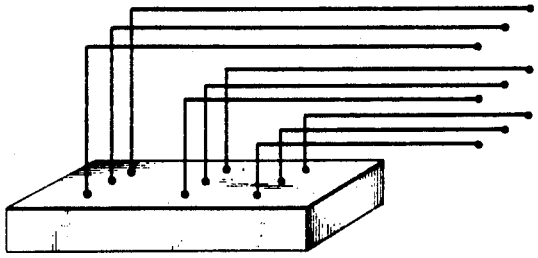
FIG. 5, Part (a) is a schematic representation of a nonstandard printed circuit board part, Part (b) is a top view of Part (a), and Part (c) is a side view.
Figure 5:
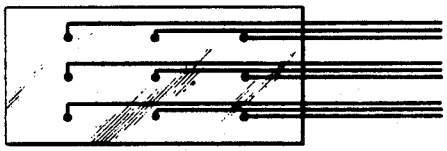
Figure 5:
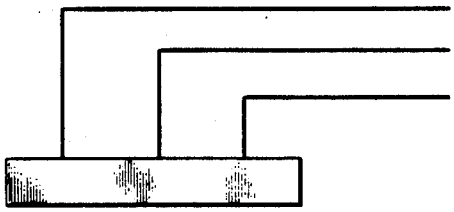

Apart from the high resolution obtained with a small number of sensing elements, another advantage of our invention arises from the geometric location of the sensing elements. Placing these elements within the fingers allows part exploration not accessible by a two-dimensional vision system using a fixed camera. For example, FIG. 5*a* shows schematically a nonstandard circuit board part. Typically, a two-dimensional fixed vision system sees the part as in FIG. 5*b*. If the camera is small enough to allow rotation, and a suitable lighting condition is provided, it is conceivable that a gripper mounted camera could see a side view of the object as in FIG. 5*c*. For small objects, this is a nontrivial task. And even in the most favorable environments, the camera-in-hand could not access the region between the pins. In contrast, the eye-in-finger device proposed here allows inspection of the pins by inserting the finger between them. Clearly, the advantages of this design increase as the size of the parts to be handled decreases. Fiberoptic arrangements similar to the one described could be adapted to smaller fingers.

In addition, where it is desired to detect the relative distance of an object from each finger, our invention can be combined with a proximity sensor (e.g., a magnetic sensor described by G. Beni et al., *supra*). This sensor can be easily combined with other sensors placed on the finger pads. Our invention can also be used as a complement to a vision system which detects two-dimensional shapes. As mentioned previously, our invention is particularly suited to the three-dimensional examination of parts placed between the robot fingers, e.g., nonstandard printed circuit board parts. As this is a dynamic sensor, it is also suitable for real-time tracking of edges and contours.

Finally, as mentioned previously, the sensor may be mounted on, for example, a table top, and a robot (or other mechanical apparatus) may be used to move the object in the gap between the arrays. Thus, the sensor is fixed, but the robot motion is used to scan the arrays. Of course, this type of application means that the robot computer is programmed to know the exact position of the robot hand at all times so that for each such position it can correlate the sensor data and thereby determine the position of the object in the robot gripper. This approach, however, is not preferred inasmuch as the robot gripper partially blocks the light beams when it is between the arrays.

What is claimed is:

1. A robotic system comprising a robot having a hand which includes movable fingers for inspecting and/or handling an object, an array of optical emitters on one of said fingers and an array of optical receptors on another of said fingers, said arrays capable of being in optical communication with one another, said array of optical emitters including at least one linear set of emitter devices for generating collimated optical beams, means for causing said hand to position said object between said fingers and for moving said hand so that said array of emitters scans said object, thereby generating an image of said object from said array of receptors, and means responsive to said image for controlling the position of said hand.

2. The robotic system of claim 1 wherein said array of emitters includes at least two linear sets of emitter devices arranged at an angle to one another.

3. The robotic system of claim 2 wherein said array of receptors also includes at least two linear sets of receptor devices arranged at an angle to one another so as to place said emitter devices and receptor devices in one-to-one correspondence with one another.

4. The robot of claim 1, 2 or 3 wherein said at least one linear set of devices comprises a plurality of linear sets, at least one of which is located along the periphery of said fingers.

5. The robot of claim 4 wherein said fingers each have a surface which is used to contact said object and said arrays are recessed from said surface.

6. The robot of claim 5 wherein said fingers are adapted to that said surfaces are maintained essentially parallel to one another during the motion of said fingers.

7. The robot of claim 5 further including a light source and a light detector, and wherein said emitter devices comprise GRIN lenses coupled to said light source and said receptor devices comprise GRIN rod lenses coupled to said light detector, said GRIN rod lenses being adapted to generate substantially collimated parallel light beams which pass between said arrays, thereby producing from said array of receptors optical signals corresponding to the shape of said object when said object is positioned between said fingers.

8. The robot of claim 4 wherein said linear sets are oriented to form a T-shaped pattern.

9. The robot of claim 4 wherein said linear sets are oriented to form a U-shaped pattern.

10. A manufacturing method, which includes a process of handling and/or inspecting an object, said process comprising the steps of:

causing the hand of a robot to move to position an object between its fingers one of which includes a first array of light emitters and another of which includes a second array of light receptors which are capable of being in optical communication with said emitters, said first array comprising at least one linear set of emitters, moving the hand so that the array of emitters scans the object, thereby generating an image of the object from the array of receptors, and controlling the position of the robot and/or the handling of the object in response to said image.

11. A manufacturing method, which includes the process of handling an object, said process comprising the steps of:

causing a robot to move an object between an array of optical emitters and an array of optical receptors, said arrays capable of being in optical communication with one another, said array of optical emitters including at least one linear set of emitter devices, thereby generating an image of said object from said array of receptors, and controlling said robot in response to said image.

12. Dynamic optical sensing apparatus comprising an array of optical emitters and an array of optical receptors capable of being in optical communication with one another, said array of optical emitters including at least one linear set of emitter devices for generating collimated optical beams, means for positioning an object between said arrays and for moving said object so that said array of emitters scans said object, thereby generating an image of said object from said array of receptors, and means responsive to said image for controlling and positioning and moving means.

13. The apparatus of claim 12 wherein said array of emitters includes at least two linear sets of emitter devices arranged at an angle to one another.

14. The apparatus of claim 13 wherein said array of receptors also includes at least two linear sets of receptor devices arranged at an angle to one another so as to place said emitter devices and receptor devices in one-to-one correspondence with one another.

15. The apparatus of claim 14 further including a light source and a light detector, and wherein said emitter devices comprise GRIN rod lenses coupled to said light source and said receptor devices comprise GRIN rod lenses coupled to said light detector, said GRIN rod lenses being adapted to generate substantially collimated parallel light beams which pass between said arrays, thereby producing from said array of receptors optical signals corresponding to the shape of said object when said object is moved between said arrays.

16. The robot of claim 14 wherein said linear sets are oriented to form a T-shaped pattern.

17. The robot of claim 14 wherein said linear sets are oriented to form a U-shaped pattern.

* * * * *